(12) United States Patent
Kane

(10) Patent No.: US 9,371,910 B2
(45) Date of Patent: Jun. 21, 2016

(54) PISTON FOR A RADIAL PISTON MACHINE

(75) Inventor: Brian Kane, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 785 days.

(21) Appl. No.: 13/642,158

(22) PCT Filed: Feb. 25, 2011

(86) PCT No.: PCT/EP2011/000939
§ 371 (c)(1),
(2), (4) Date: Jan. 2, 2013

(87) PCT Pub. No.: WO2011/131269
PCT Pub. Date: Oct. 27, 2011

(65) Prior Publication Data
US 2013/0205996 A1 Aug. 15, 2013

(30) Foreign Application Priority Data

Apr. 19, 2010 (DE) .......................... 10 2010 015 417

(51) Int. Cl.
*F01B 13/06* (2006.01)
*F16J 1/01* (2006.01)
*F04B 53/14* (2006.01)

(52) U.S. Cl.
CPC . *F16J 1/01* (2013.01); *F04B 53/14* (2013.01); *F05C 2253/04* (2013.01); *F05C 2253/12* (2013.01)

(58) Field of Classification Search
CPC ......... F16J 1/01; F04B 53/14; F05C 2253/04; F05C 2253/12
USPC ............................ 92/248, 177, 181 P; 91/488
See application file for complete search history.

(56) References Cited

U.S. PATENT DOCUMENTS

| 4,144,798 | A | * | 3/1979 | Cyphelly ........................ 91/488 |
| 4,212,230 | A | * | 7/1980 | Eickmann ............. F01B 13/061 91/488 |
| 5,947,003 | A | * | 9/1999 | Jepsen et al. ..................... 92/248 |
| 2013/0228071 | A1 | * | 9/2013 | Nagel ................... F04B 1/0408 92/178 |

FOREIGN PATENT DOCUMENTS

| DE | 39 26 185 A1 | | 2/1991 | |
| DE | 3926185 | * | 2/1991 | ................ F04B 1/04 |
| DE | 40 37 455 C1 | | 2/1992 | |
| DE | GB2250784 | * | 6/1992 | ............. F01B 13/06 |
| DE | 39 26 185 C2 | | 2/1994 | |
| DE | 195 18 875 A1 | | 11/1996 | |

OTHER PUBLICATIONS

International Search Report corresponding to PCT Application No. PCT/EP2011/000939, mailed May 25, 2011 (German and English language document) (5 pages).

* cited by examiner

*Primary Examiner* — Nathaniel Wiehe
*Assistant Examiner* — Dustin T Nguyen
(74) *Attorney, Agent, or Firm* — Maginot, Moore & Beck LLP

(57) ABSTRACT

A piston for a radial piston machine includes a metal core that is substantially provided with a casing made of plastic. The casing is configured to be produced from PEEK together with a bearing shell as one piece and injection-molded onto the core.

9 Claims, 5 Drawing Sheets

PISTON FOR A RADIAL PISTON MACHINE

This application is a 35 U.S.C. §371 National Stage Application of PCT/EP2011/000939, filed on Feb. 25, 2011, which claims the benefit of priority to Serial No. DE 10 2010 015 417.2, filed on Apr. 19, 2010 in Germany, the disclosures of which are incorporated herein by reference in their entirety.

BACKGROUND

The disclosure relates to a piston for a radial piston machine.

Radial piston machines have cylinder/piston units which are arranged radially or in the manner of a star, an oscillating movement of the piston in relation to the associated cylinder being generated, for example, by an outside, wave-shaped lifting cam. Cylindrical rolling bodies, on each of which a piston is mounted in, roll along the lifting cam. The pistons, in this case, are accommodated in a central cylinder body. The number of strokes of each piston at one revolution of the machine is determined by the number of cams on the circumference of the lifting cam.

As claimed in the prior art, the pistons of these types of radial piston machines are produced from metal.

Document DE 40 37 455 C1 shows a radial piston machine, a bearing shell, which mounts the piston in relation to the cylindrical rolling body, being shown in a recess of each piston in the abutment region to the associated cylindrical rolling body.

Document DE 39 26 185 C2 shows a piston for a radial piston machine having a bearing shell which has a plastics material layer which abuts against the cylindrical rolling body.

As claimed in the prior art, regions of the piston abutting against the respectively associated cylinder are metallic. The high point loads which occur between the piston and the associated cylinder in this case are disadvantageous. In order to achieve the necessary surface quality or surface finish, a high amount of expenditure on production is necessary.

In contrast, the object underlying the disclosure is to create a piston for a radial piston machine where the point loads against the associated cylinder and the production costs of the piston are reduced.

SUMMARY

Said object is achieved by a piston for a radial piston machine with the features of the disclosure.

The piston according to the disclosure for a radial piston machine has a metallic core which is provided substantially with a casing of plastics material. As a result, the point loads of the piston against the associated cylinder are reduced as the forces are distributed at the cylinder by deforming the plastics material of the casing. Consequently, in the case of radial piston machines with pistons according to the disclosure, higher pressures can be realized than with those of the prior art. In addition, where the thickness of the casing increases and the diameter of the core is correspondingly reduced, there is a reduction in the weight of the piston. Consequently, the masses to be accelerated during the operation of the radial piston machine are reduced, as a result of which there is optimization of efficiency—in particular in the case of increasing speeds.

Further advantageous developments of the disclosure are described in the dependent claims.

To reduce the amount of expenditure on the production of the piston according to the disclosure, it is preferred when the casing is injected onto the core.

In the case of a preferred further development of the piston according to the disclosure, the core has a metallic main portion on which a recess for accommodating a rolling body is provided. In this case, a bearing shell of plastics material is arranged on a wall of the recess that faces the rolling body.

In the case of a preferred further development of the disclosure, a surface of the bearing shell abutting against the rolling body has at least one small indentation for accommodating pressure means, said indentation being connected by means of a channel to an end face of the piston or of the core which is facing an operating space or pressure space of the cylinder. During operation, a pressure means which is acted upon with high pressure by means of the channel, and thus serves for compensating the pressure force in the abutment region, is collected in the indentation or indentations. A hydrodynamic bearing arrangement is provided by means of said indentation from a certain speed.

When a circumferential lateral surface of the main portion is provided with a casing of plastics material, this serves as compensation for production inaccuracies or tolerances between the piston and the cylinder.

In a preferred further development, the casing of the lateral surface of the main portion has a circumferential sealing lip or a circumferential O-ring seal which can be formed in one piece with the casing and which abuts against the cylinder in the installed state. Consequently, a seal between the operating or pressure space of the cylinder and the low-pressure region of the radial piston machine is created with a minimum amount of expenditure on production.

When the main portion is greater along the rolling body than perpendicular thereto, a lengthening or enlarging of the piston, and consequently of its pressure surface, occurs. When the corresponding cylinder is adapted to said form, a cylinder/piston unit with increased volume is created.

In the case of a preferred further development, the piston according to the disclosure is a differential piston, a radially reduced, central, metallic journal portion being mounted on the main portion of the core. When the journal portion is inserted into a correspondingly radially reduced guide portion of the cylinder, the piston is guided along its lifting direction.

If a circumferential, for example approximately cylindrical, lateral surface of the journal portion is provided with a casing of plastics material, said casing serves as compensation for production inaccuracies or tolerances between the journal portion and the guide portion of the cylinder.

For pressure equalization between the guide portion and the main portion of the cylinder, it is preferred when the journal portion and/or the casing of the journal portion are provided with flattenings or radial indentations or grooves.

To reduce expenditure on production, the casing of the main portion and the casing of the journal portion can be formed in one piece.

When the piston has a bearing shell of plastics material, over and above this said bearing shell can also be formed in one piece with the casing of the main portion and with the casing of the journal portion.

In the case of a further development of the differential piston according to the disclosure, the casing of the main portion and the casing of the journal portion are connected by means of an intermediate portion. Said intermediate portion has the pressure surface of the piston.

BRIEF DESCRIPTION OF THE DRAWINGS

Various exemplary embodiments of the disclosure are described below by way of the figures, in which, in detail.

DETAILED DESCRIPTION

Figure 1:
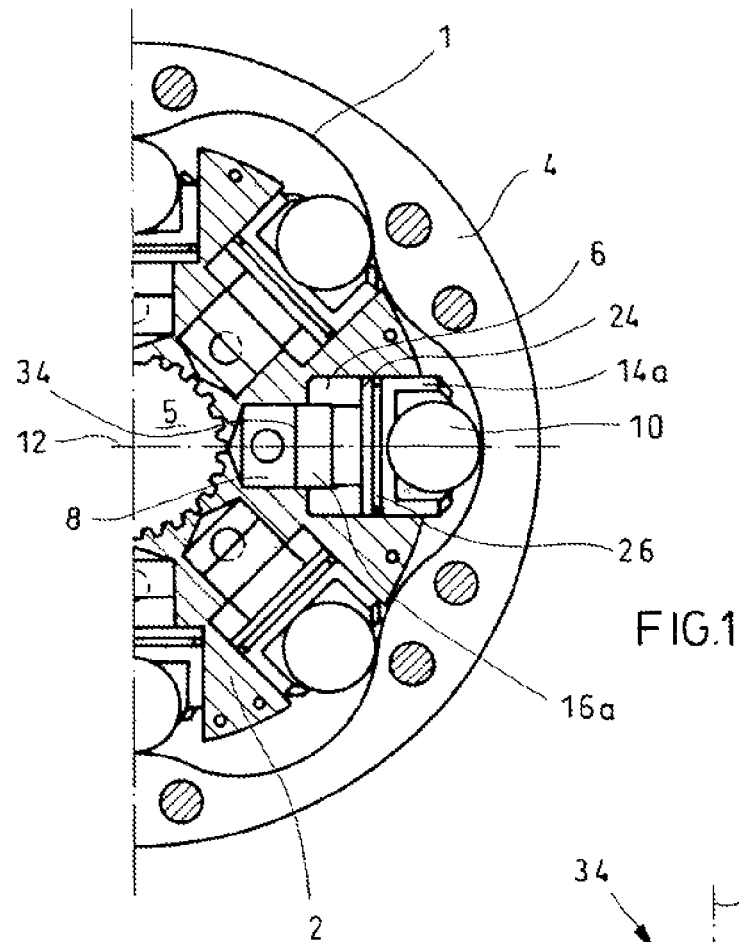
FIG. 1 shows a sectioned representation of a detail of a radial piston machine with pistons according to a first exemplary embodiment.

FIG. 1 shows a sectioned representation of a detail of a radial piston machine. It has a circumferential wave-shaped lifting cam 1 and eight cylinder/piston units, of which only three are shown completely in FIG. 1 and two further ones are shown in part. The cylinders are arranged in a radial manner or in a star-shaped manner in a rotating rotor 2, whilst the lifting cam 1 is realized on a stationary cam disk 4. Depending on the machine type, the rotation of the rotor 2 is transmitted to a shaft 5 (motor) or is transmitted in reverse from the shaft 5 to the rotor 2 (pump).

Each cylinder has a main portion 6 and a radially reduced guide portion 8 on its surface facing the shaft 5.

Each cylinder-piston unit has a rolling body 10 which rolls along the lifting cam 1 when the rotor 2 rotates and at the same time carries out an oscillating lifting movement with reference to a longitudinal axis 12. In this case, one piston is mounted on each rolling body 10. Each piston has a main portion, of which only a casing 14a is shown in FIG. 1, and a journal portion, of which also only a casing 16a is shown in FIG. 1. The main portion of the piston abuts against the rolling body 10 and is accommodated in the main portion 6 of the cylinder, whilst the journal portion of the piston is accommodated in the guide portion 8 of the cylinder.

Figure 2:
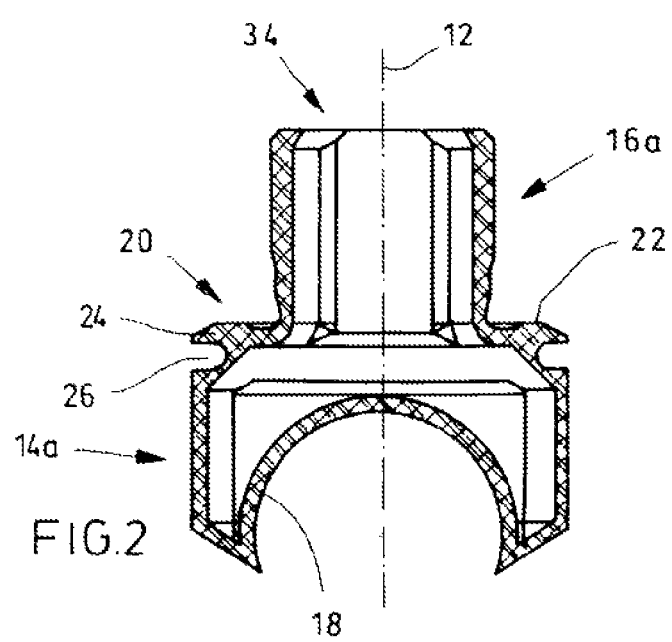
FIG. 2 shows a sectioned representation of a casing of a piston according to the first exemplary embodiment.

FIG. 2 shows a sectioned representation of a casing 14a, 16a of the piston according to the disclosure according to the first exemplary embodiment, said casing being produced in one piece from PEEK. It includes or surrounds a main portion 14b and a journal portion 16b of a core produced from metal (not shown in FIG. 2). A bearing shell 18, which serves as a sliding bearing for the rolling body 10, is formed in one piece with the casing 14a, 16a. In addition, an intermediate portion 20 of the casing is formed between the casing of the main portion 14a and the casing of the journal portion 16a. An approximately ring-shaped pressure surface 22, which is encompassed by a lip which is also incorporated in one piece into the casing or an O-ring seal 24 which is also incorporated in one piece into the casing, is formed on the top surface (in FIG. 2) of the intermediate portion 20 of the casing. It abuts against the main portion 6 of the cylinder during the operation of the radial piston machine according to the disclosure and seals off a corresponding ring-shaped pressure space (cf. reference 6 in FIG. 1) from a low-pressure region. A groove 26 is arranged between the O-ring seal 24 and the casing of the main portion 14a.

Figure 5A:
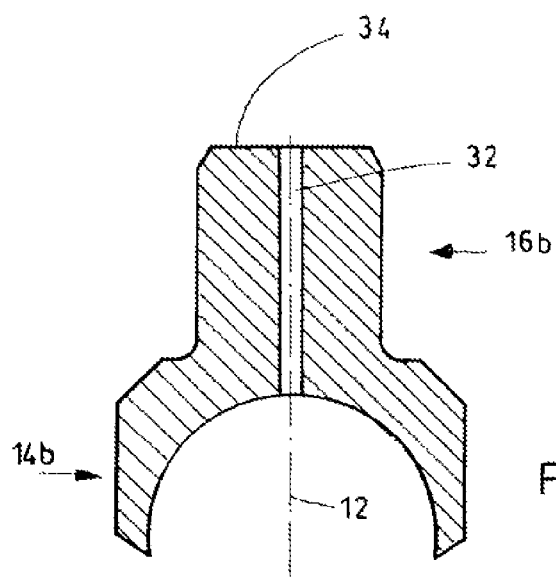
FIGS. 5 a-c show various representations of a core of the piston according to the first and according to the second exemplary embodiment.
Figure 5B:
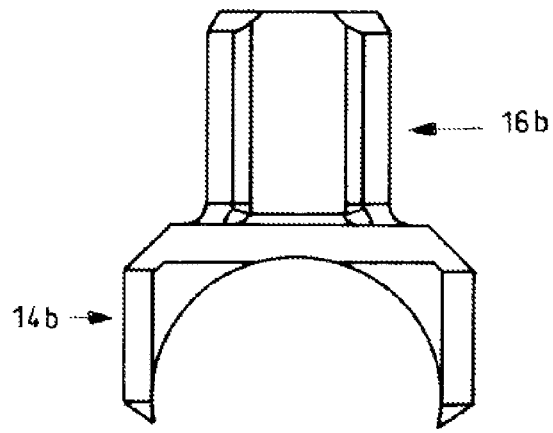
Figure 5C:
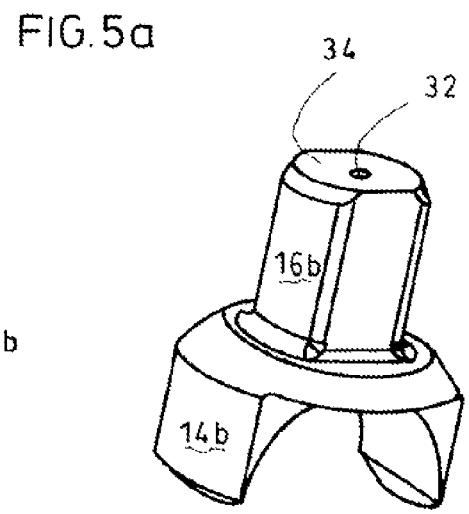

The casing of the piston formed in one piece from PEEK consequently includes the casing of the journal portion 16a, the intermediate portion 20, the O-ring seal 24, the casing of the main portion 14a and finally the bearing shell 18. A core of steel, which is shown in FIGS. 5a-c, is arranged in the interior of the casing shown.

Figure 3A:
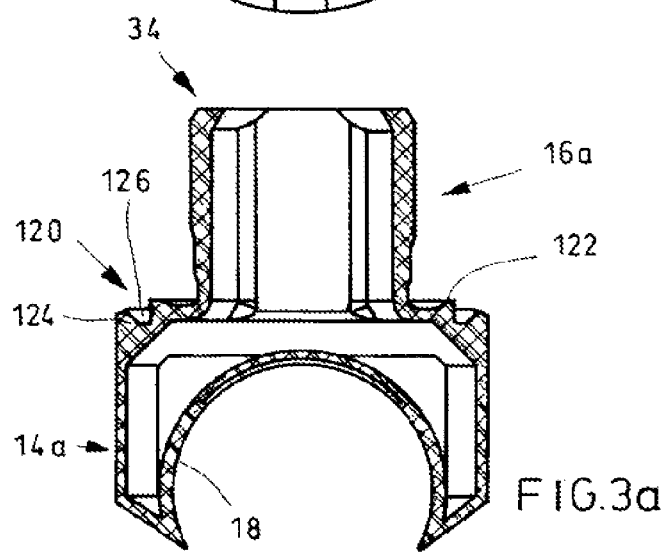
FIGS. 3 a-c show various representations of a casing of a piston according to a second exemplary embodiment.
Figure 3B:
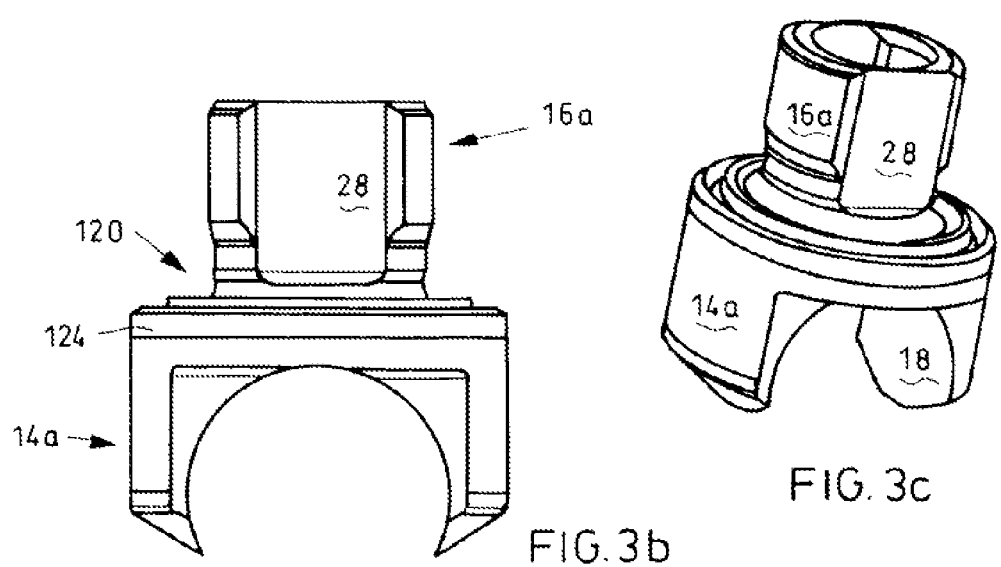
Figure 3C:
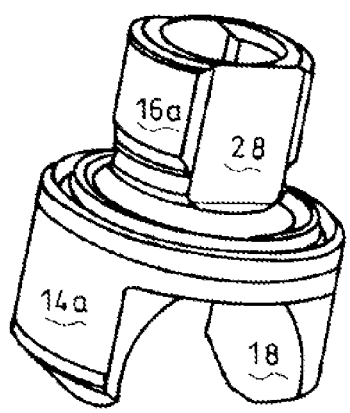

FIGS. 3a-c show a casing of a piston according to the disclosure according to a second exemplary embodiment. FIG. 3a shows a sectioned, side view of the casing, FIG. 3b shows a side view of the casing and FIG. 3c shows a perspective view of the casing. The casing shown according to the second exemplary embodiment corresponds extensively to that of the first exemplary embodiment. An intermediate portion 120 connects the casing of the journal portion 16a in one piece to the casing of the main portion 14a, an approximately ring-shaped pressure surface 122 being realized on its top surface (in FIGS. 3a-c). In this case, for sealing off the corresponding pressure space, instead of the O-ring seal 24 a sealing lip 124 is provided in one piece on the intermediate portion 120 or on the casing of the main portion 14a. The sealing lip 124 extends substantially along a cylinder wall in the direction of the pressure space.

The casing of the journal portion 16a, in the case of the first exemplary embodiment according to FIG. 2 and in the case of the second exemplary embodiment according to FIGS. 3a-c, has two laterally arranged flattenings or indentations which are located opposite each other, of which only one indentation 28 is shown in FIGS. 3b and 3c. They provide a pressure means connection between the ring-shaped pressure space arranged in the main portion 6 of the cylinder and a pressure space formed in the guide portion 8. Consequently, the approximately ring-shaped pressure surface 22, 122 and a top (in the figures) end face 34 of the piston according to the disclosure are acted upon equally with operating pressure.

Figure 4:
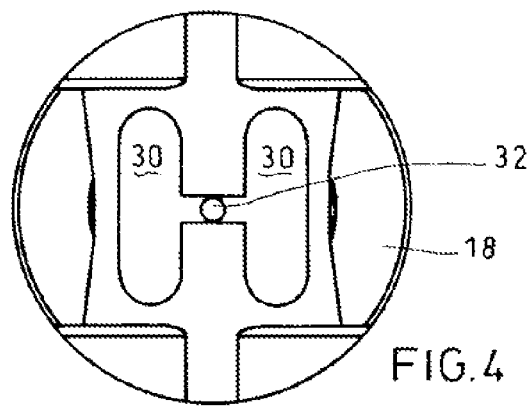
FIG. 4 shows a detail of a bearing shell of the piston according to the first and according to the second exemplary embodiment.

FIG. 4 shows a detail of the bearing shell 18 of the first and of the second exemplary embodiment. It has two flat indentations 30 which are connected to the top end face 34 of the piston according to the disclosure by means of a channel 32. Consequently, operating pressure or high pressure prevails in the two indentations 30 such that the piston according to the disclosure is relieved of pressure in relation to the associated rolling body 10 and is mounted in a hydrodynamic manner. As a result of the hydrodynamic bearing arrangement, the indentation is very small.

During the operation of the machine, a maximum pressing occurs between the rolling body 10 and the bearing shell 18, laterally offset (e.g. to the left in FIG. 4). Consequently, the corresponding hydrodynamic bearing arrangement is effected in the region of the one indentation 30 (in the case of this example the one on the left), whilst leakage can occur at the other indentation 30 (in the case of this example the one on the right). In order to minimize this, a passage into which the channel 32 opens out is provided between the two indentations 30.

FIGS. 5a-c show a core of the piston according to the disclosure according to the first and to the second exemplary embodiment, FIG. 5a showing a longitudinal section, FIG. 5b showing a side view and FIG. 5c showing a perspective view. The core consists of steel and is realized in such a manner that the casing 16a, 14a and the bearing shell 18 according to the two first exemplary embodiments (cf. FIGS. 2 and 3a) can be formed by substantially injecting around equally with PEEK.

FIG. 5a shows the channel 32, which extends along the longitudinal axis 12 and connects the recesses 30 of the bearing shell 18 (cf. FIG. 4) to the top end face 34 of the core or of the piston for relieving pressure.

Figure 6A:
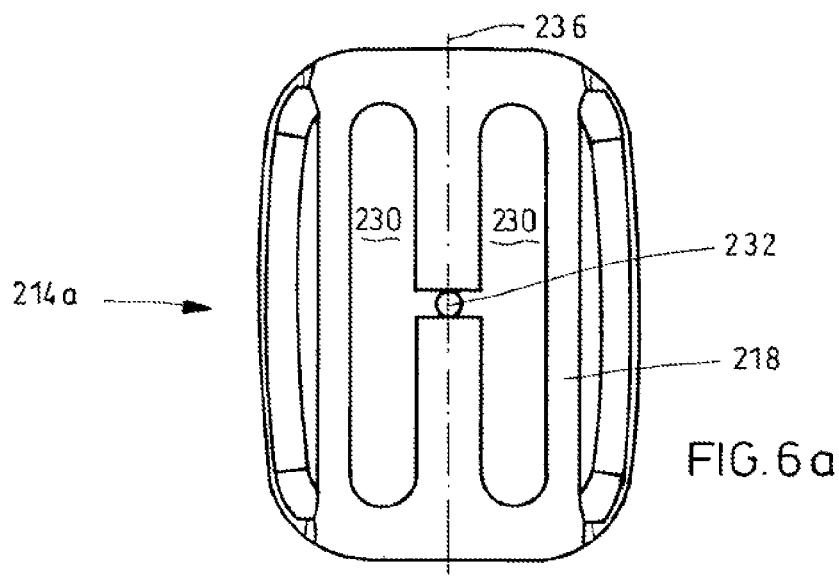
FIGS. 6 a-c show various representations of a casing of a piston according to a third exemplary embodiment.
Figure 6B:
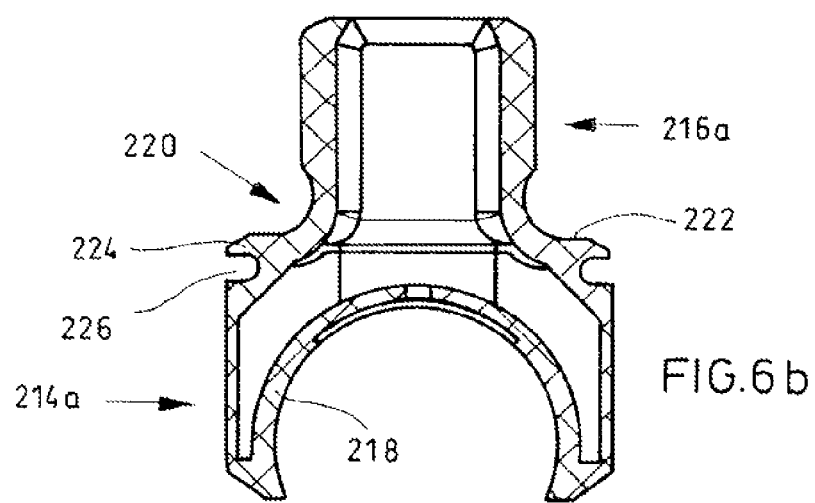
Figure 6C:
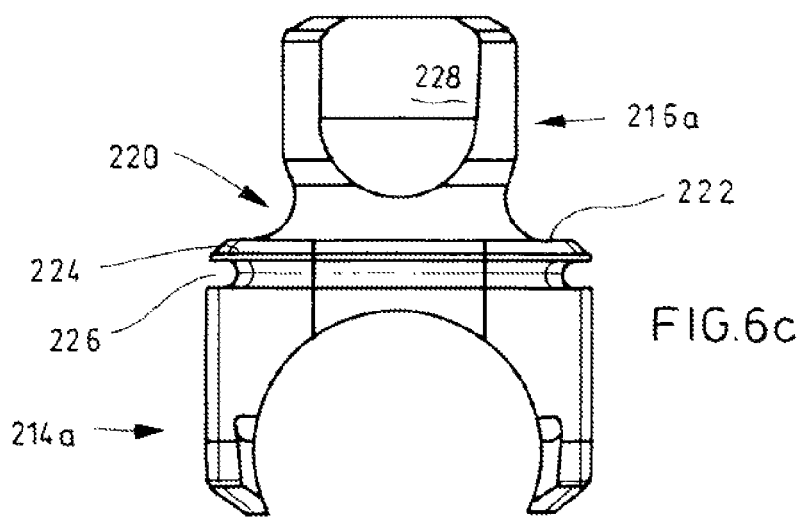

FIGS. 6a-c show a casing of a piston according to the disclosure according to a third exemplary embodiment, FIG. 6a showing a view from below of the casing, FIG. 6b showing a side section of the casing and FIG. 6c showing a side view of the casing. The casing of the third exemplary embodiment corresponds in part to that of the first exemplary embodiment according to FIG. 2. A casing 216a of the journal portion is also substantially circularly cylindrical. An O-ring seal 224 is realized on an intermediate portion 220 as sealing means.

Unlike the aforedescribed exemplary embodiments, a casing 214a of the main portion and a bearing shell 218 have an elongated form where a dimension along a rolling body longitudinal axis 236 is greater than transversely or perpendicularly thereto. Consequently, a pressure surface 222 along the rolling body longitudinal axis 236 is lengthened or enlarged in relation to the aforedescribed exemplary embodiments.

Figure 7A:
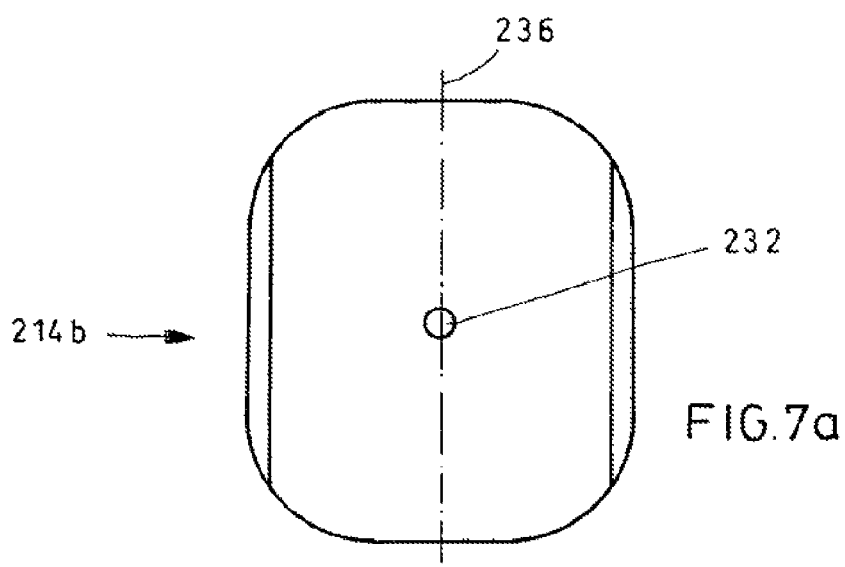
FIGS. 7 a-c show various representations of a core of the piston according to the third exemplary embodiment.
Figure 7B:
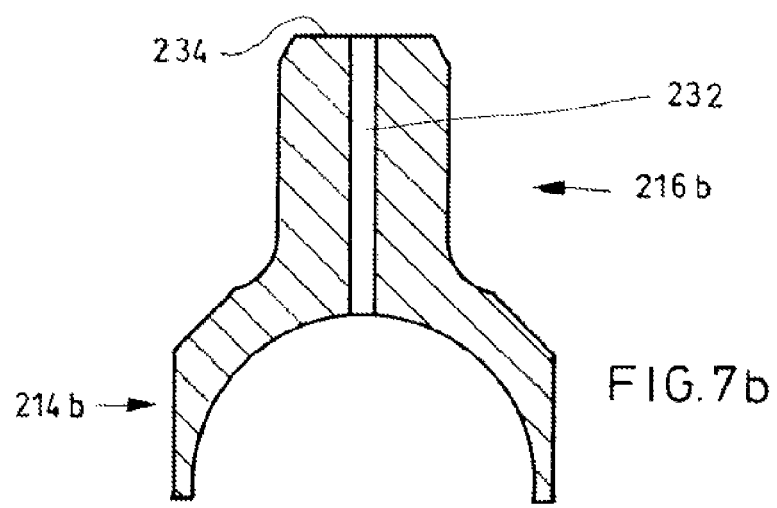
Figure 7C:
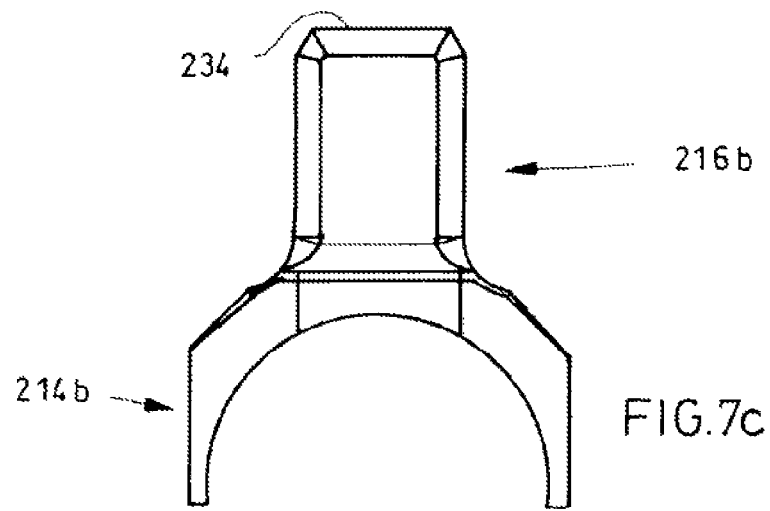

FIGS. 7a-c shows a core of the piston according to the disclosure according to the third exemplary embodiment, FIG. 7a showing a view from below of the core, FIG. 7b showing a side sectioned representation of the core and FIG. 7c showing a side view of the core.

FIG. 7a shows that the main portion 214b of the core along the rolling body longitudinal axis 236 is also enlarged or lengthened in relation to the aforedescribed exemplary embodiments.

The piston according to the disclosure according to the third exemplary embodiment is consequently assembled from the core shown in FIGS. 7a-c and the casing shown in FIGS. 6a-c. It is used in a radial piston machine where the respective main portion of the cylinder has a cross section which corresponds to the outer contour of the casing 214a shown in FIG. 6a. Consequently, the volume of the cylinder is enlarged, as a result of which the absorption or conveying volume of the radial piston machine is increased.

Deviating from the third exemplary embodiment according to FIGS. 6a-c, the piston with the lengthened main portion can also have a sealing lip 124 according to the second exemplary embodiment (cf. FIGS. 3a-c) instead of the integrally formed O-ring seal 224.

A piston for a radial piston machine with a metallic core which is provided substantially with a casing of plastics material is disclosed.

The casing can be formed in one piece with a bearing shell of PEEK and/or can be injected onto the core.

The invention claimed is:

1. A radial piston machine, comprising:
a rotor configured to rotate about a rotational axis; and
a plurality of pistons, each piston of the plurality of pistons having a longitudinal axis oriented perpendicular to the rotational axis, each piston comprising:
a metallic core including a metallic main portion having a recess configured to accommodate a rolling body; and
a casing of plastics material injection molded onto the metallic core and including a bearing shell formed of the plastics material arranged on a wall of the recess facing the rolling body,
wherein a surface of the bearing shell abutting the rolling body defines an indentation having a depth that is less than a nominal thickness of the bearing shell, and
wherein the piston defines a channel extending through the piston fluidly connecting the indentation to an end face of the piston facing an operating space.

2. The radial piston machine as claimed in claim 1, wherein:
the metallic main portion includes a lateral surface, and
the casing of plastics material extends over the lateral surface.

3. The radial piston machine as claimed in claim 1, wherein the casing has a circumferential sealing lip abutting a cylinder defined in the rotor or a circumferential O-ring seal abutting the cylinder defined in the rotor.

4. The radial piston machine as claimed in claim 1, wherein the metallic main portion of each piston, when viewed in a plane perpendicular to the longitudinal axis of the piston, has a length and a width, and the length is not equal to the width.

5. The radial piston machine as claimed in claim 1, wherein:
the metallic core has a first maximum radius,
the metallic core includes a metallic journal portion mounted on the metallic main portion, the metallic journal portion having a second maximum radius that is less than the first maximum radius, and
the casing of plastics material includes a plastic journal portion extending over a lateral surface of the metallic journal portion.

6. The radial piston machine as claimed in claim 5, wherein one or more of the metallic journal portion and the plastic journal portion defines a flattened region or a radial indentation.

7. The radial piston machine as claimed in claim 5, wherein:
the metallic main portion includes a lateral surface,
the casing of plastics material includes a plastic main portion extending over the lateral surface of the metallic main portion, and
the plastic main portion and the plastic journal portion are formed in one piece.

8. The radial piston machine as claimed in claim 7, wherein the plastic main portion and the plastic journal portion are formed in one piece with the bearing shell.

9. The radial piston machine as claimed in claim 5, wherein:
the metallic main portion includes a lateral surface,
the casing of plastics material includes a plastic main portion extending over the lateral surface of the metallic main portion, and a plastic intermediate portion connecting the plastic main portion and the plastic journal portion.

* * * * *